US012042436B1

(12) United States Patent
Lollini

(10) Patent No.: US 12,042,436 B1
(45) Date of Patent: Jul. 23, 2024

(54) SUSPENDED AEROSOL ISOLATION BARRIER

(71) Applicant: Linda Lollini, Livermore, CA (US)

(72) Inventor: Linda Lollini, Livermore, CA (US)

( * ) Notice: Subject to any disclaimer, the term of this patent is extended or adjusted under 35 U.S.C. 154(b) by 0 days.

(21) Appl. No.: 17/460,305

(22) Filed: Aug. 29, 2021

Related U.S. Application Data

(60) Provisional application No. 63/071,774, filed on Aug. 28, 2020.

(51) Int. Cl.
*A61G 10/00* (2006.01)

(52) U.S. Cl.
CPC .................................. *A61G 10/005* (2013.01)

(58) Field of Classification Search
CPC ............ A47C 29/00–006; A62B 31/00; A61G 10/00–04; A61B 46/00–40; A61B 90/05; A61B 90/40; A61B 2090/401
See application file for complete search history.

(56) References Cited

U.S. PATENT DOCUMENTS 4,966,167 A * 10/1990 Jacobs ................... A61B 46/27 128/849
5,865,182 A * 2/1999 Chen ...................... A61B 90/50 128/849
6,317,910 B1 * 11/2001 Wilson ................. A47C 29/003 135/96
8,413,269 B1 * 4/2013 Vail ...................... A61G 7/0526 5/663
11,049,626 B1 * 6/2021 Ahearn .................. A61B 90/05
11,179,287 B1 * 11/2021 Mirbahaeddin ........ A61G 15/10
2016/0166455 A1 * 6/2016 Steinert .................. A61B 42/10 600/21
2019/0000580 A1 * 1/2019 Scheib ................... A61B 34/30
2019/0150628 A1 * 5/2019 Wennerström ......... B01D 53/04
2020/0275724 A1 * 9/2020 Jefferis .................... A42B 3/28
2021/0290465 A1 * 9/2021 Ta .......................... A61B 90/40
2021/0298973 A1 * 9/2021 Barbosa ................. A61G 10/02
2021/0331109 A1 * 10/2021 Sahiholnasab ..... B01D 46/0041
2021/0353380 A1 * 11/2021 Sellars .................. A61B 90/50
2021/0353467 A1 * 11/2021 Orrington, II ......... A61B 90/05
2021/0401651 A1 * 12/2021 Ernstoff ................. A61B 46/23
2023/0181400 A1 * 6/2023 Matsushima .......... A61G 10/02 160/127

* cited by examiner

*Primary Examiner* — Thaddeus B Cox
(74) *Attorney, Agent, or Firm* — Adibi IP Group, PC; Amir V. Adibi; Andrew C. Palmer

(57) ABSTRACT

A Suspended Aerosol Isolation Barrier (SAIB) comprises a suspended protective barrier, an optional lateral protective barrier, and a ceiling surface connector. The SAIB reduces exposure to airborne particles and aerosols for both patients and service providers, and protects those in the vicinity and unmasked individuals in adjacent areas. The suspended protective barrier includes a frame and a transparent layer. The suspended protective barrier attaches to a ceiling disposed above. The lateral protective barrier is a flexible material that attaches to a perimeter of the suspended protective barrier and extends downwards. The ceiling surface connector has a first end that attaches to the suspended protective barrier and a second end that attaches to the ceiling. A service provider attaches the lateral protective barrier to the suspended protective barrier after sanitization. Once a patient is seated, the SAIB is lowered over the patient such that the patient is protected by the SAIB.

20 Claims, 17 Drawing Sheets

SUSPENDED AEROSOL ISOLATION BARRIER
(PERSPECTIVE VIEW)

SUSPENDED AEROSOL ISOLATION BARRIER
(SIDE VIEW)

SUSPENDED AEROSOL ISOLATION BARRIER
(TOP-DOWN VIEW)

SUSPENDED AEROSOL ISOLATION BARRIER BEFORE ATTACHING LATERAL PROTECTIVE BARRIER (SIDE VIEW)

SUSPENDED AEROSOL ISOLATION BARRIER
(SIDE VIEW)

SUSPENDED AEROSOL ISOLATION BARRIER
(PERSPECTIVE VIEW)

SUSPENDED AEROSOL ISOLATION BARRIER
(ANOTHER EMBODIMENT WITHOUT LATERAL
PROTECTIVE BARRIER)

SUSPENDED AEROSOL ISOLATION BARRIER
(ANOTHER EMBODIMENT WITHOUT LATERAL
PROTECTIVE BARRIER)

SUSPENDED AEROSOL ISOLATION BARRIER ASSEMBLY KIT

420/430/440

MATERIALS

One - 18" x 24" 0.080" Clear Acrylic Sheet
Polytube Cutter (one that cuts up to 1 ½" or wider PVC pipe)
½" PVC Pipe-
  Two - 21 ½" length ½" PVC pipe pieces
  Two - 15 ½" length ½" PVC pipe pieces
Four - ½" 90° PVC Elbow Joints
Twist Chain #200 (See #A)
  Four – 24" pieces of twist chain (all must be exact length)
  One or Two – Approx 50" piece of twist chain
The length of this chain will be determined by your ceiling height
You may want 2 of these chains for dual positions to hang the SAIB. This will be explained in the directions.
Four – 3/4" Split Key Rings
Three-1" Split Key Rings (See #B)
5/16" x 2 3/8' Spring Snap (See #C)
Four – Screw Eye Hooks #210 x 1 - 3/16" (See #D)
Ten - 1" S Hooks (See #E)
Clear masking tape
0.7 Mil Painters Plastic Sheeting (9ft x 400ft) Rolls (See #F)
* Each office will need to determine the best and safest means to mount one or two I-Bolts above the operatory chair. Anchorage to a joist or strut is advised if possible.

MATERIALS
FIG. 11A

MATERIALS

410

ASSEMBLY

1. Cut ½" PVC to the specified length w/ a PVC Tube Cutter ( two pieces 21 ½" ) ( two pieces 15 1/2" )
2. Connect PVC w/ 90° ½" PVC elbow joints as shown. Do not use PVC Cement. (See #1)
3. Lay the PVC frame on a flat surface and adjust connections so that the frame is in one even plane.
4. Slightly round corners of 18" x 24" clear acrylic sheets with acrylic burs or lathe and smooth.
5. Center clear acrylic sheet over the PVC frame. Mark clear acrylic sheet w/ permanent marker in locations to allow Eye Hook Screw to go through acrylic at a 45° angle to anchor into the 90° PVC elbow joints. Stay away from the edge of the clear acrylic sheet edges to prevent cracking. (See #2).
6. Pre-drill openings in clear acrylic at these marked locations. Drill at 45° angle toward PVC elbow. Drill hole large enough so that the screw eye hooks do not bind on the clear acrylic.
7. Center the clear acrylic over the PVC frame. Mark the 90° PVC elbows through the clear acrylic sheet holes showing where the screw eye hooks will make contact with the elbow joints.
8. Pre-drill PVC elbows at the same 45° angle with a drill bit that is slightly smaller than the diameter of the screw eye hooks.
9. Assure that protective plastic is off of the clear acrylic. Anchor the clear acrylic sheet to the PVC frame with the screw eye hooks. DO NOT OVERTIGHTEN OR TIGHTEN BEYOND MILD TO MODERATE RESISTANCE or the clear acrylic sheet or PVC elbow joints may crack. If the eye hooks bind heavily in the PVC elbows, subtly widen hole. If eyehooks engage upon the clear acrylic sheet, slightly open for no engagement. (See #2)
10. Cut four 24" pieces of #200 twist chain. Assure that all pieces are the same length.
11. Connect one 24" piece of twist chain to each corner eye hook with a 3/4" split key ring. (See #3).
12. Flip the frame upside down so that the chains hang unimpeded and can untwist. Gather the 4 chains without adding twist and anchor all chains with a single 1" split key ring. (See #4).
13. Return right side up. Attach one Interlocking Spring Snap to this 1" split key ring. (See #4).

INSTRUCTIONS

FIG. 12A

INSTRUCTIONS

410

MOUNTING OF ANCHOR I-BOLT / ANCHOR CHAIN (Suspension Assembly for SAIBs) :

Every office is different in space, ceiling height and joists/beams/struts for anchorage. An I-Bolt will need to be properly and safely installed into the ceiling above the operatory chair. Assure that the I-Bolt is anchored to a solid ceiling strut or alternatively create a beam anchored to adjacent struts to assure a strong enough anchor to support the frame and its movements. A mechanism to allow the Suspended Aerosol Isolation Barrier to swing away or slide away is an alternative if space allows. A large toggle bolt could be used through drywall yet this method is not assured to be of sufficient strength so as not to fall or damage the ceiling. Please get advice from a proper source first to assure what requirements may be necessary to prevent damage to the building, equipment, patients or employees.

Location of Mounting I-Bolt (See Photo 5 for one option of Mounting I-Bolt):

It is important to experiment with location before installing the I-Bolt. One I-Bolt and chain can be used or preferably two I-Bolts and chains can be used. Two I-Bolts and chains allows more flexibility for the SAIB to be centered over the patient. It is first advised to seat an approximately 6ft patient in the dental chair and mark their chin location below on the dental chair. Repeat with an approximately 5' 4" patient. Hover the chain from a ceiling location until it centers on these locations on the chair and mark these spots on the roof.

Two Mounting Methods:

One Mounting I-Bolt – Mount the I-Bolt in either the center of the two determined marks described above or alternatively mount the I-Bolt closer to the mark appropriate for 6 ft patient.

Two Mounting I-Bolts – Mount one I-Bolt at the 6ft patient mark and the other at the 5' 4" patient mark. This method allows for more flexibility to center the tent over the operating area.

Instructions for Mounting of ceiling I-Bolt, hanging Twist Chain and Suspended Aerosol Barrier 1. Mount the Ceiling I-Bolts to the ceiling location as advised above. Professional advice is advised to avoid damage to the ceiling, equipment, patient or staff.
2. Cut an appropriate amount of twist chain to hang the Suspended Aerosol Isolation Tent Assembly in the lowest possible position possibly needed.
3. Anchor the Twist Chain to the ceiling I-Bolt using a 1" Split Key Ring.
4. Attach a 1" Split Key Ring to the opposite end of the Twist Chain
5. Attach the Suspended Aerosol Barrier to the 1" Split Key Ring with the Interlocking Spring Snap (See #4).

INSTRUCTIONS

FIG. 13

410

Use Of The Suspended Aerosol Isolation Barriers

1. Attach the SAIB Assembly to the hanging chain by attaching the Interlocking Spring Snap from the Assembly onto the 1" Split Key Ring on the chain.
2. Cut approximately 30" strips of the 9' plastic sheeting. Many sheets can be cut in advance to save time. (Sheets will be approximately 30" x 9 ft.)
3. Attach the Plastic Sheeting to the Frame.
    a. Determine where one arm hole will generally enter the frame assembly (ie. Above the patients head).
    b. Attach one end of the 9" plastic sheeting to the edge of the clear acrylic sheet with tape.
    c. Attach the other end of the plastic sheet to the same area with tape (assuring not twisted), overlapping the material a couple inches.
    d. Find the ½ way point of the plastic sheeting (approx. 4 ½ ft) and attached this to the edge of the frame assembly on the opposite side of the frame with tape.
    e. Do the same to find the middle of the sides and tape to the sides of the frame.
    f. Continue sealing up the other areas with tape by puckering or folding. This excess plastic allows for extra material to fit various sized people and accommodates movements without moving the frame excessively.
    g. Cut additional slits in the plastic where hands will enter. Keep slits to a minimum in both quantity and size to maximize aerosol retention.
    h. An alternative to the Plastic Sheeting and tape is the use of elastic equipment drapes.
4. Adjust the height of the frame by anchoring a 1" S-Hook on the Split Key Ring above the Interlocking Spring Snap and then latch the other end of the S-Hook to a proper height on the Twist Chain suspended from the ceiling. Start with the frame up higher than needed until the patient is in position then adjust as appropriate.
5. It is advised that the patients be advised of the use of this protective barrier prior to the appointment.
6. Seat patient in dental chair with mask on. Hold the frame and plastic up while lowering the patient. The plastic sheeting is then comfortably draped around the patient. Raise or lower the frame assembly with the S-Hook to an appropriate level. Be sure to leave enough room to easily /safely maneuver instruments.
7. Should you need the frame to be at an angle, this same technique can be used on two adjacent chains to raise or lower sides as needed. This situation may occur in situations such as a patient who is unable to recline in the chair. Extra S-Hooks should be on hand as needed.
8. Extra care and slower motions should be used when inserting and removing instruments and when flipping or passing instruments. This is to avoid bumping onto the clear acrylic sheet or side plastic and thus losing a proper grip of instruments or equipment.
9. Patients should never be left unattended. These frames may not be appropriate for young children. These frames may not be appropriate for patients with claustrophobia.
10. When the procedure is completed, wait a couple minutes for the aerosol to fall. An additional HVE line can be used or attached within the frame for additional removal of aerosols during and/or after the procedure.
11. Lift the SAIB and upright the patient.
12. Removal of Plastic Sheeting
    a. Slowly remove tape to avoid tape sticking to the SAIB.
    b. Use controlled slow removal of the plastic sheeting to minimize air turbulence and aerosol escape. Throw away plastic sheeting after every appointment.
    c. Thoroughly spray and decontaminate SAIB and suspending chain. Allow frame to sit for the specified amount of time for the disinfectant used.
    d. It is advised to alternate frames (pre-draped) to allow sufficient disinfecting time and to improve room turnover rate.

INSTRUCTIONS

FIG. 14

CONVENTIONAL AEROSOL TRANSMISSION REDUCTION TECHNIQUES

SUSPENDED AEROSOL ISOLATION BARRIER

CROSS REFERENCE TO RELATED APPLICATIONS

This application claims the benefit under 35 U.S.C. § 119 from U.S. Provisional Patent Application No. 63/071,774, entitled "Suspended Aerosol Isolation Barrier," filed on Aug. 28, 2020, the subject matter of which is expressly incorporated herein by reference.

TECHNICAL FIELD

The present invention relates generally to medical devices, and more specifically, to aerosol containment instruments.

BACKGROUND INFORMATION

The presence of Covid-19 has created new and serious challenges for industries which provide close-proximity patient/client interaction and care. At significant risk are those providers in the field of dentistry. The combination of sustained contact between provider and patient, the minimal physical proximity necessary and the level of exposure to aerosolized oral pathogens from procedures or merely breathing creates a high-risk situation. For these reasons, it is imperative that those in the dental field and other similar fields utilize all means available and reasonable to limit exposure. Presently, there are many products that attempt to prevent or evacuate these aerosols.

SUMMARY

A Suspended Aerosol Isolation Barrier (SAIB) comprises a suspended protective barrier, an optional lateral protective barrier, and a ceiling surface connector. The SAIB reduces exposure to airborne particles and dental aerosols for both patients and medical providers. The suspended protective barrier includes a frame and a transparent layer. The suspended protective barrier attaches to a ceiling surface disposed above. The lateral protective barrier is a flexible material that attaches to a perimeter of the suspended protective barrier and extends downwards. The lateral protective barrier is optional and is not included in some embodiments. The ceiling surface connector has a first end that attaches to the suspended protective barrier and a second end that attaches to the ceiling surface.

In operation, a service provider, such as a dentist or dental hygienist, sanitizes an area and the suspended protective barrier of the SAIB. Next, the service provider optionally attaches the lateral protective barrier to the suspended protective barrier. After the patient enters the area and is seated, the SAIB is lowered over the patient. The patient is covered and protected by the SAIB. Next, the service provider extends their hands through the lateral protective barrier to serve the patient. The service provider sees the patient through the transparent layer of the suspended protective barrier. After the patient visit is complete, the SAIB is raised permitting the patient to exit the area. After the patient has left, the area is sanitized, the lateral protective barrier is discarded (if the lateral protective barrier is employed), the suspended protective barrier is sanitized, and a new lateral protective barrier is optionally attached to the suspended protective barrier in preparation for the next patient.

In one embodiment, a SAIB is provided as an SAIB assembly kit. The SAIB assembly kit includes materials for forming a suspended protective barrier and a ceiling surface connector, and an amount of instructions. The instructions provide instructions as to how to assemble the SAIB, how to mount the ceiling surface connector to a ceiling, and how to use the SAIB. An amount of tools is optionally provided along with the SAIB assembly kit to aid users in assembly and installation of the SAIB. The SAIB assembly kit is provided in a single package or in a plurality of packages. The instructions are provided via printed materials or via a link to a digital resource that provides the instructions to users. Materials and instructions for forming and using the lateral protective barrier are optionally included in the SAIB assembly kit.

The novel SAIB provides significant flexibility for service providers to perform work on a patient. Service providers are able to approach a patient from various sides and angles. Conventional systems that address aerosol transmission do not provide flexibility to practitioners. Existing techniques do not easily move or adjust to accommodate a service provider's positioning, and practitioners tend to be impeded by barrier positioning. In addition, the novel SAIB accommodates all sizes of patients. The novel SAIB is suspended overhead thereby providing for easy removal, allowing patients to comfortably enter and exit, and allowing adjustment of height of the SAIB to be at a comfortable level for both practitioners and patients. Suspension of the novel SAIB consumes minimal to no floor space thereby providing more leg room and operational space for service providers.

The SAIB is applicable to any environment in which a service provider is performing services on a person. A service provider is able to perform work on a client who is covered by the SAIB more safely than if no SAIB were utilized. The SAIB may be used in other medical settings and in non-medical settings where services are provided to patients or clients. The SAIB provides a low-cost and quick assembly technique for containment of aerosols and for minimizing transfer of aerosols between individuals. The suspended protective barrier is formed from low-cost materials, including a transparent layer formed by a clear acrylic sheet and a frame formed from PVC pipes. Use of the SAIB reduces transfer of aerosols as compared to settings where the SAIB is not utilized. Sanitation of the SAIB is also more efficient as compared to existing techniques, because the lateral protective barrier is cheap and disposable and the suspended protective barrier is formed from low-cost materials and is easily sanitized.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 11A and 11B are diagrams showing materials 420, 430 and 440 provided with the suspended aerosol isolation barrier assembly kit 400.

FIGS. 12A, 12B, 13, and 14 are instructions 410 provided with the suspended aerosol isolation barrier assembly kit 400.

DETAILED DESCRIPTION

Reference will now be made in detail to some embodiments of the invention, examples of which are illustrated in the accompanying drawings.

Figure 1:
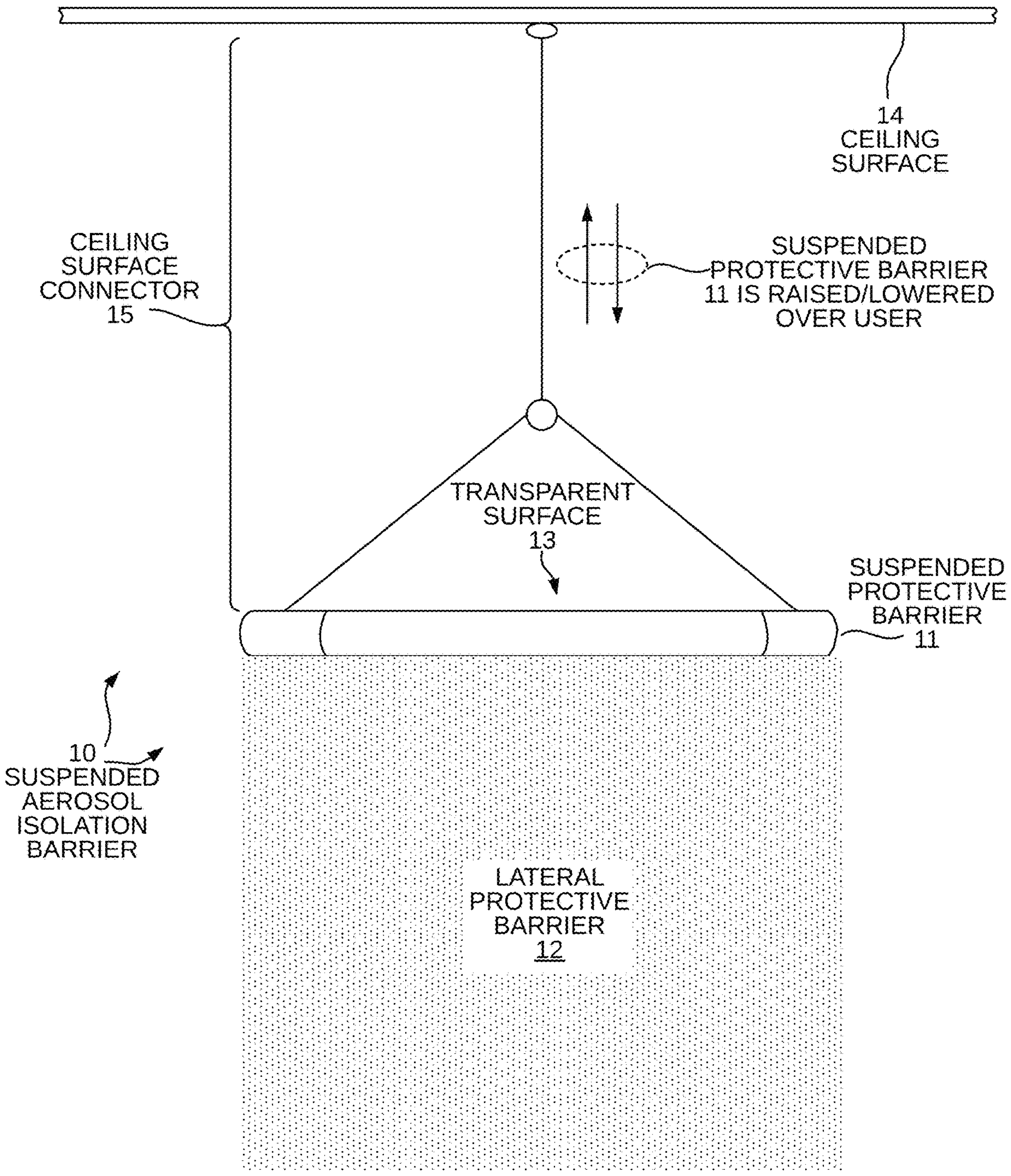
FIG. 1 is a diagram showing a Suspended Aerosol Isolation Barrier (SAIB) 10.

FIG. 1 is a diagram showing a Suspended Aerosol Isolation Barrier (SAIB) 10. The SAIB 10 includes a suspended protective barrier 11 and a lateral protective barrier 12. In this example, the lateral protective barrier 12 is a plastic sheet that attaches to the suspended protective barrier 11. The suspended protective barrier 11 has a transparent surface 13. The suspended protective barrier 11 is attached to a ceiling surface 14 via a ceiling surface connector 15. In another example the suspended protective barrier 11 attaches to a surface that is farther from the ground than the suspended protective barrier 11. In one example, a ceiling I-hook is connected to the ceiling surface 14 and the ceiling surface connector 15 connects to the ceiling I-hook. It is understood that ceilings and joists have different configurations and that any suitable ceiling attachment may be employed to attach the ceiling surface connector 15 to the ceiling surface 14.

In accordance with another novel aspect, the SAIB 10 is adjustable to be configured to cover and protect a user. The suspended protective barrier 11 is height-adjustable. For example, a service provider raises the suspended protective barrier 11 upwards, a client/patient is seated, and the service provider lowers the suspended protective barrier 11 over the client/patient once comfortably seated. In one example, the ceiling surface connector 15 includes a chain, an S-hook, a split key ring, and end anchors. The chain is connected to the ceiling surface 14. The end anchors are attached to a frame of the suspended protective barrier 11. The S-hook connects the split key ring and end anchors to the chain at an appropriate level thereby allowing the suspended protective barrier 11 to be height-adjusted to a desired level.

Figure 2:
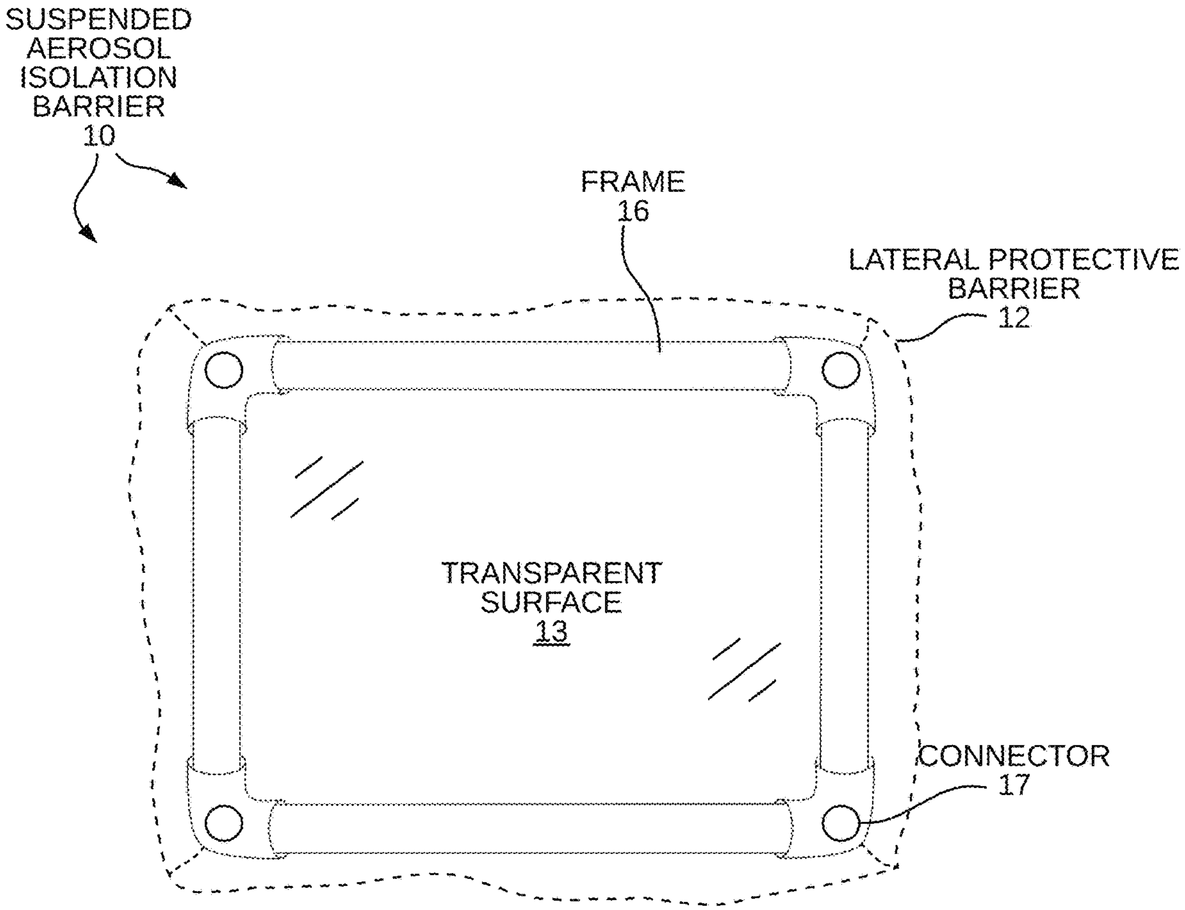
FIG. 2 is a diagram showing a top-down view of the SAIB 10.

FIG. 2 is a diagram showing a top-down view of the SAIB 10. In this example, a suspended protective barrier 11 has a rectangular-shaped frame 16 with the transparent surface 13 attached to the frame 16. Reference numeral 17 identifies a connector that is a hole in one of the corners of the frame 16. In this example, the lateral protective barrier 12 is attached to the frame 16.

Figure 3:
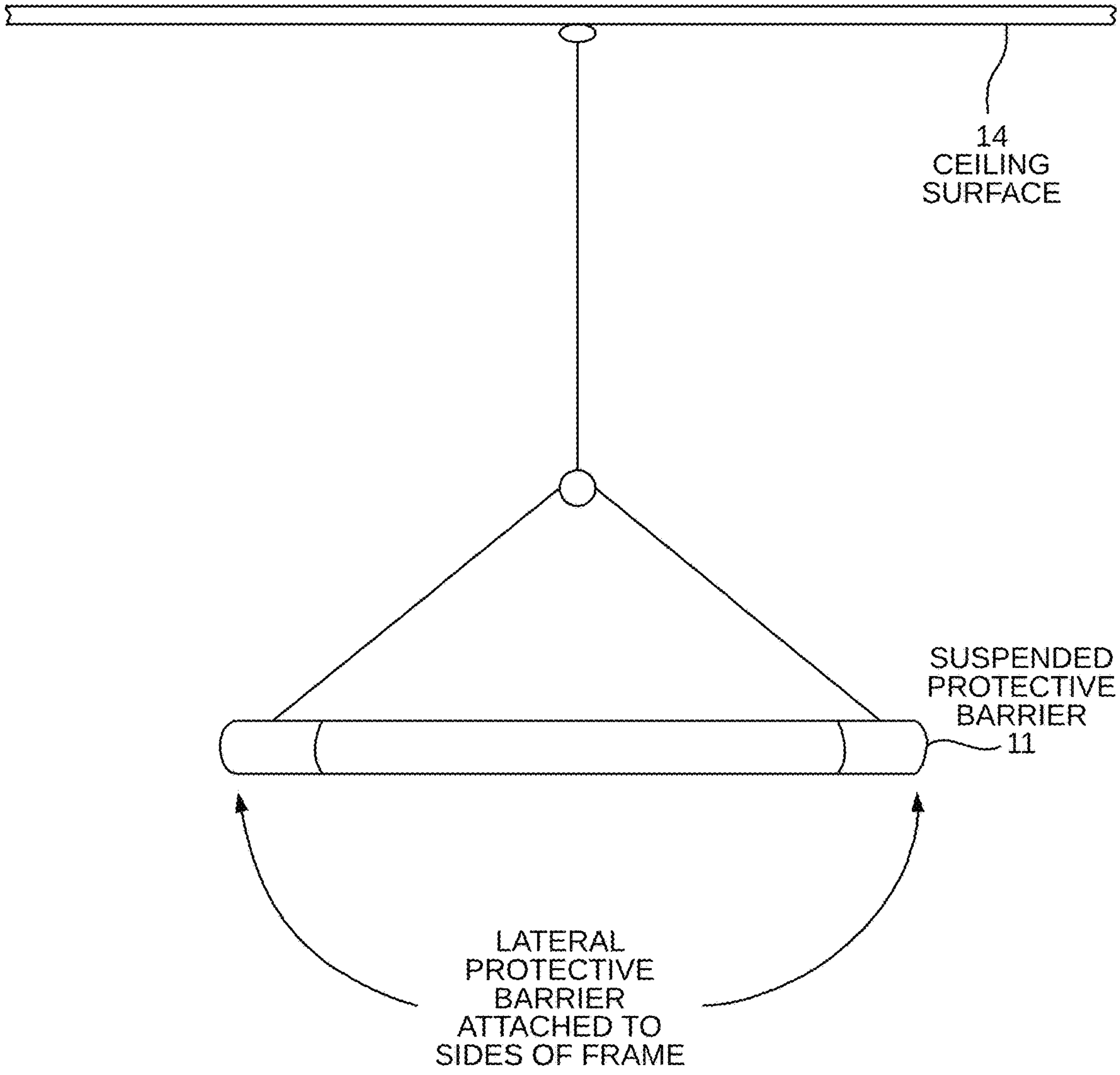
FIG. 3 is a diagram showing an example of the SAIB 10 before a lateral protective barrier is attached to a frame of the suspended protective barrier 11.

FIG. 3 is a diagram showing an example of the SAIB 10 before a lateral protective barrier is attached to the frame 16 of the suspended protective barrier 11. In this example, the suspended protective barrier 11 is attached to the ceiling surface 14.

Figure 4:
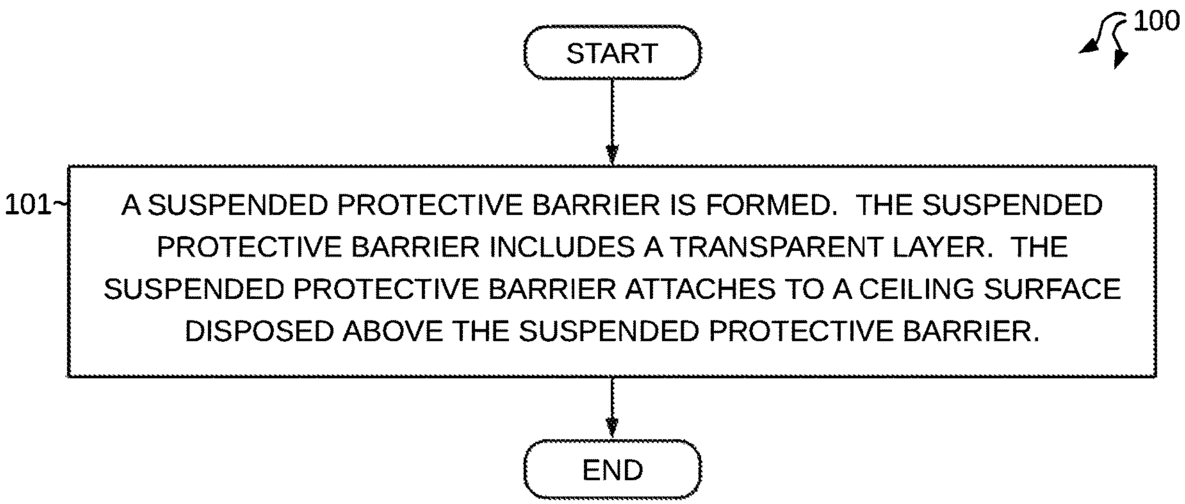
FIG. 4 is a flowchart of a method 100 in accordance with at least one novel aspect.

FIG. 4 is a flowchart of a method 100 in accordance with at least one novel aspect. In a first step (101), a suspended protective barrier is formed. The suspended protective barrier includes a transparent layer. The suspended protective barrier attaches to a ceiling surface disposed above the suspended protective barrier. In one example, the forming involves attaching a transparent layer to a frame and attaching ceiling connectors to the frame.

Figure 5:
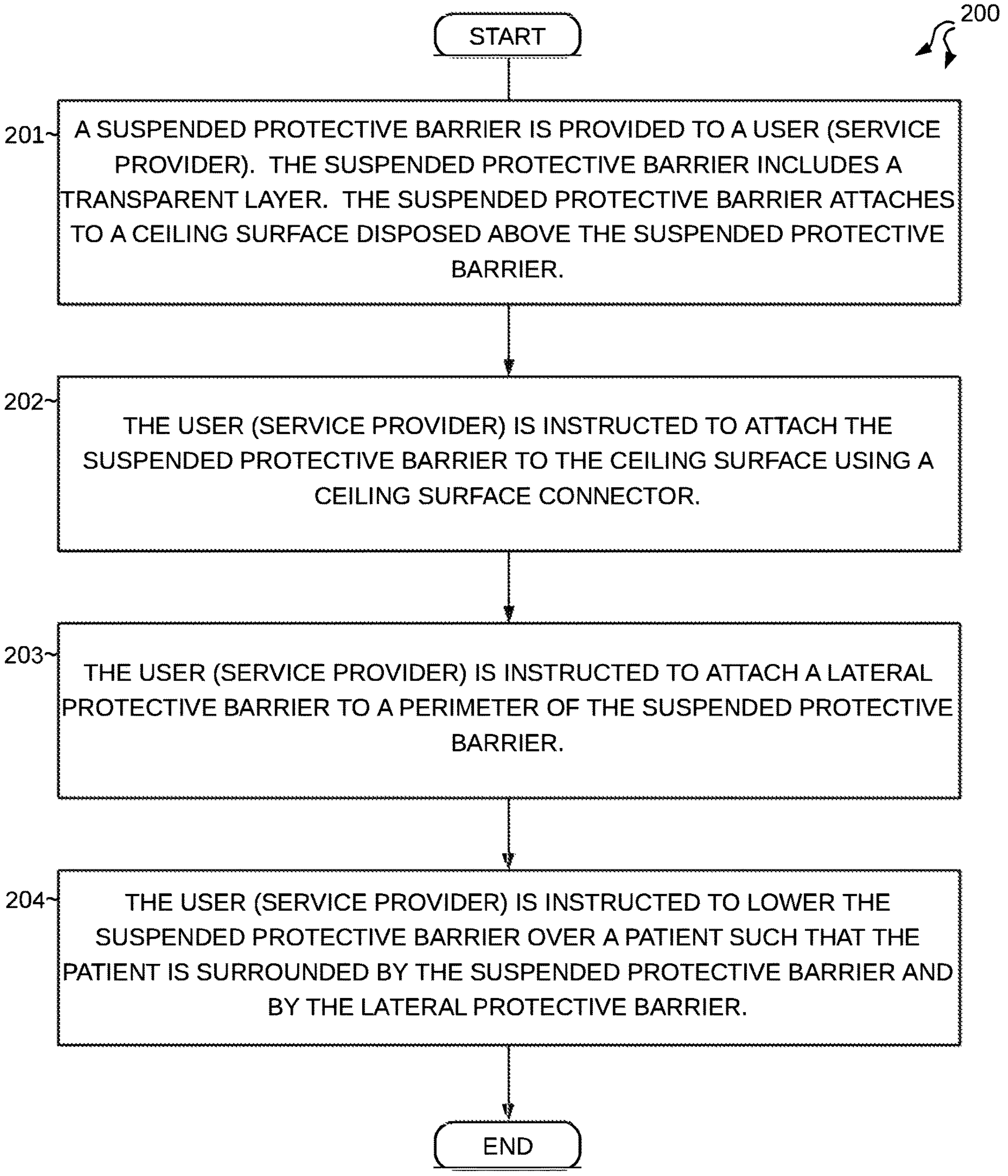
FIG. 5 is a flowchart of a method 200 in accordance with at least another novel aspect.

FIG. 5 is a flowchart of a method 200 in accordance with at least another novel aspect. In a first step (201), a suspended protective barrier is provided to a user. In one example, the user is a medical provider. The suspended protective barrier includes a transparent layer. The suspended protective barrier attaches to a ceiling surface disposed above the suspended protective barrier.

In a second step (202), the user is instructed to attach the suspended protective barrier to the ceiling surface using a ceiling surface connector.

In a third step (203), the user is instructed to attach a lateral protective barrier to a perimeter of the suspended protective barrier.

In a fourth step (204), the user is instructed to lower the suspended protective barrier over a patient such that the patient is surrounded by the suspended protective barrier and by the lateral protective barrier.

Figure 6:
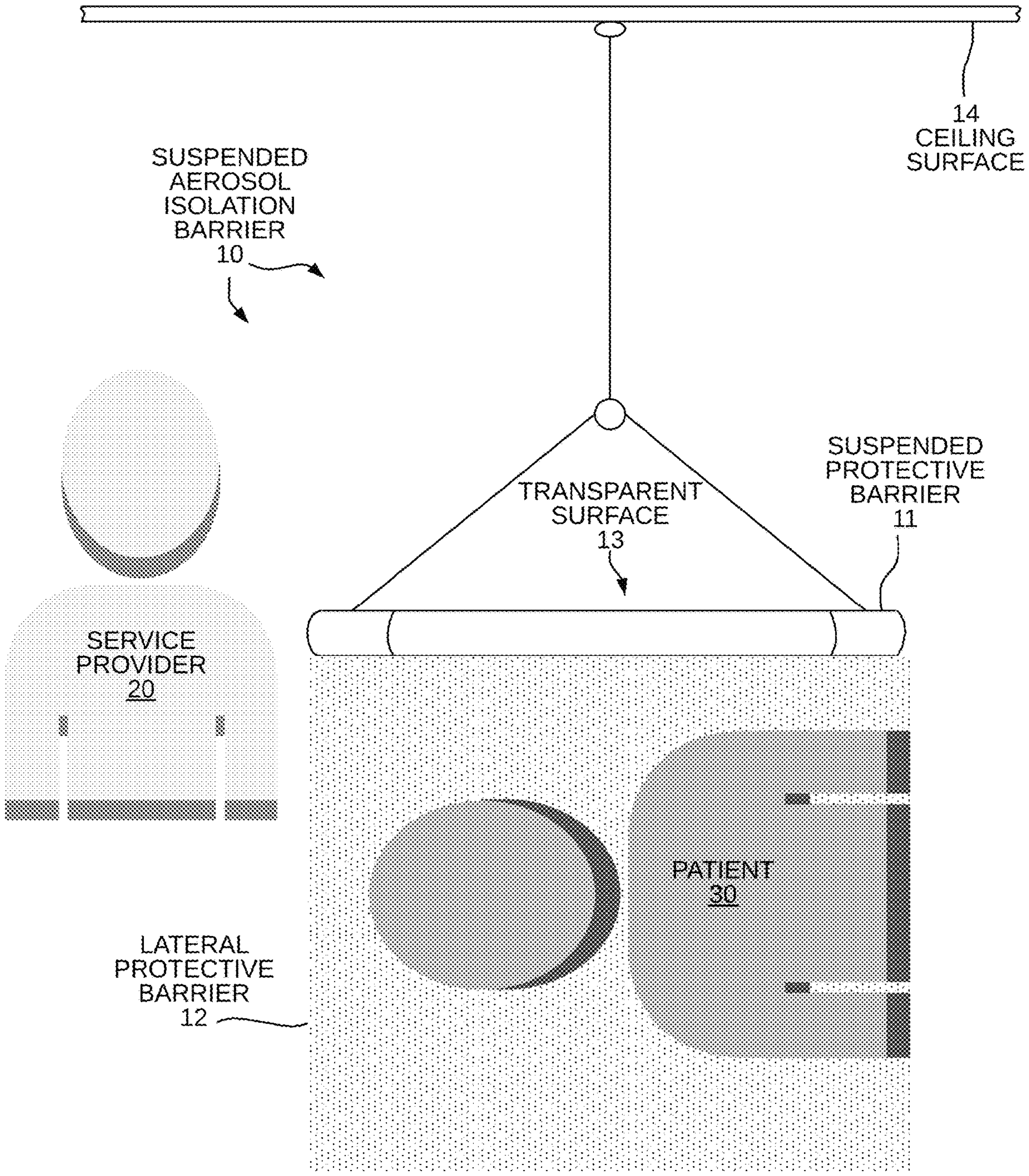
FIG. 6 is a diagram showing how the SAIB 10 reduces exposure to airborne particles and aerosols between patients and medical providers.

FIG. 6 is a diagram showing how the SAIB 10 reduces exposure to airborne particles and dental aerosols between medical provider 20 and patient 30. The SAIB 10 is adjustable to be configured to cover and protect patient 30. The suspended protective barrier 11 is height-adjustable. For example, a medical provider 20 raises the suspended protective barrier 11 upwards, the patient 30 is seated, and the medical provider 20 lowers the suspended protective barrier 11 over the patient 30. In this embodiment, lateral protective barrier 12 is attached to the suspended protective barrier 11 to further contain aerosols. In one example, the ceiling surface connector 15 includes a chain, an S-hook, a split key ring, and end anchors. The chain is connected to the ceiling surface 14. The end anchors are attached to a frame of the suspended protective barrier 11. The S-hook connects the split key ring and end anchors to the chain at an appropriate level thereby allowing the suspended protective barrier 11 to be height-adjusted to a desired level.

The SAIB 10 provides significant flexibility for medical provider 20 to perform work on the patient 30. The medical provider 20 is able to approach the patient 30 from various sides and angles. The SAIB 10 accommodates all sizes of patients. The SAIB 10 is suspended overhead thereby providing for easy removal, providing for patient 30 to comfortably enter and exit, and providing for adjustment of height of the SAIB 10 to be at a comfortable level for both the medical provider 20 and patient 30. Suspension of the SAIB 10 consumes minimal to no floor space thereby providing more leg room and operational space for medical provider 20.

Figure 7:
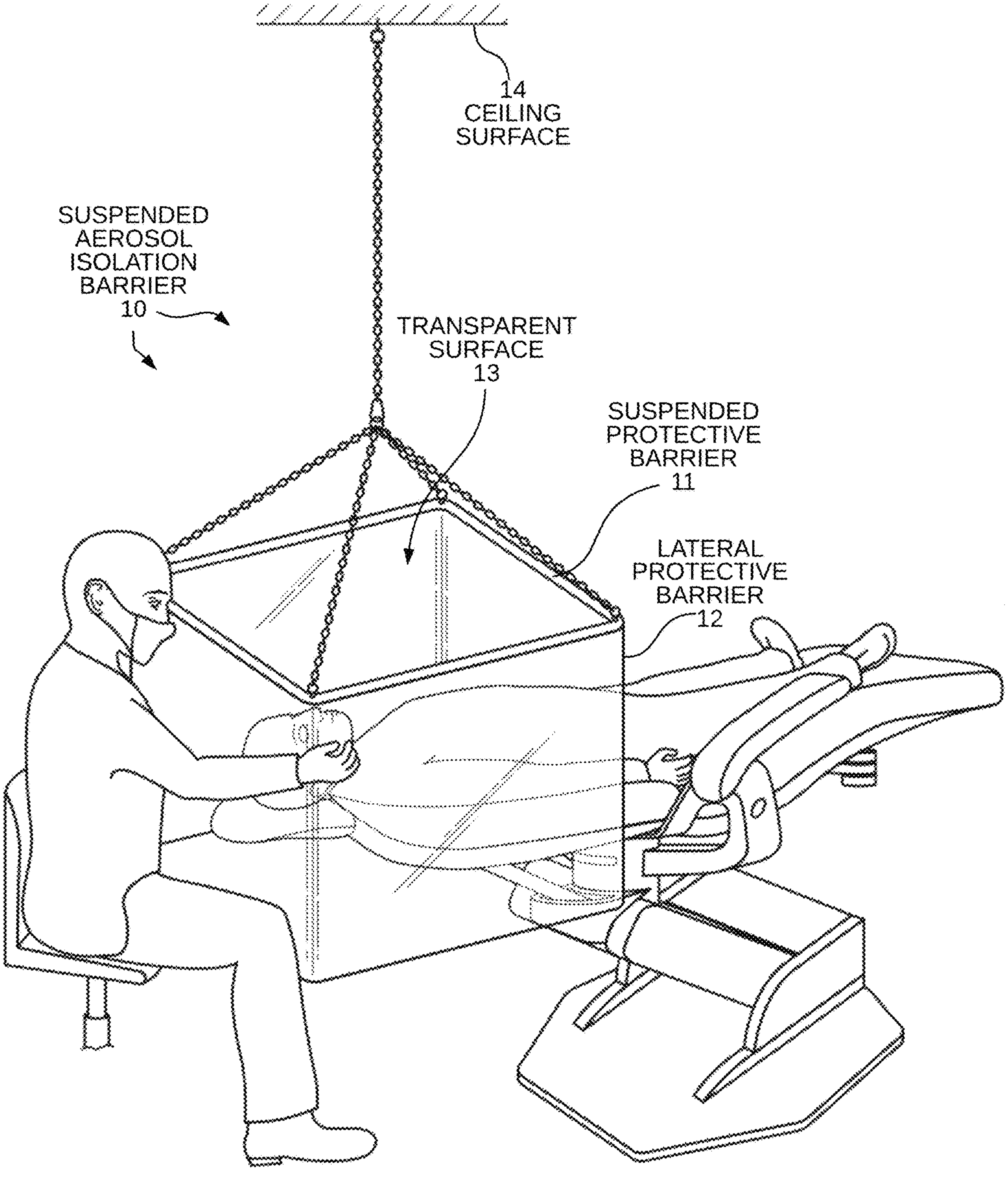
FIG. 7 is a perspective diagram showing the SAIB 10 being used in a clinical setting.

FIG. 7 is a perspective diagram showing the SAIB 10 being used in a clinical setting.

Figure 8:
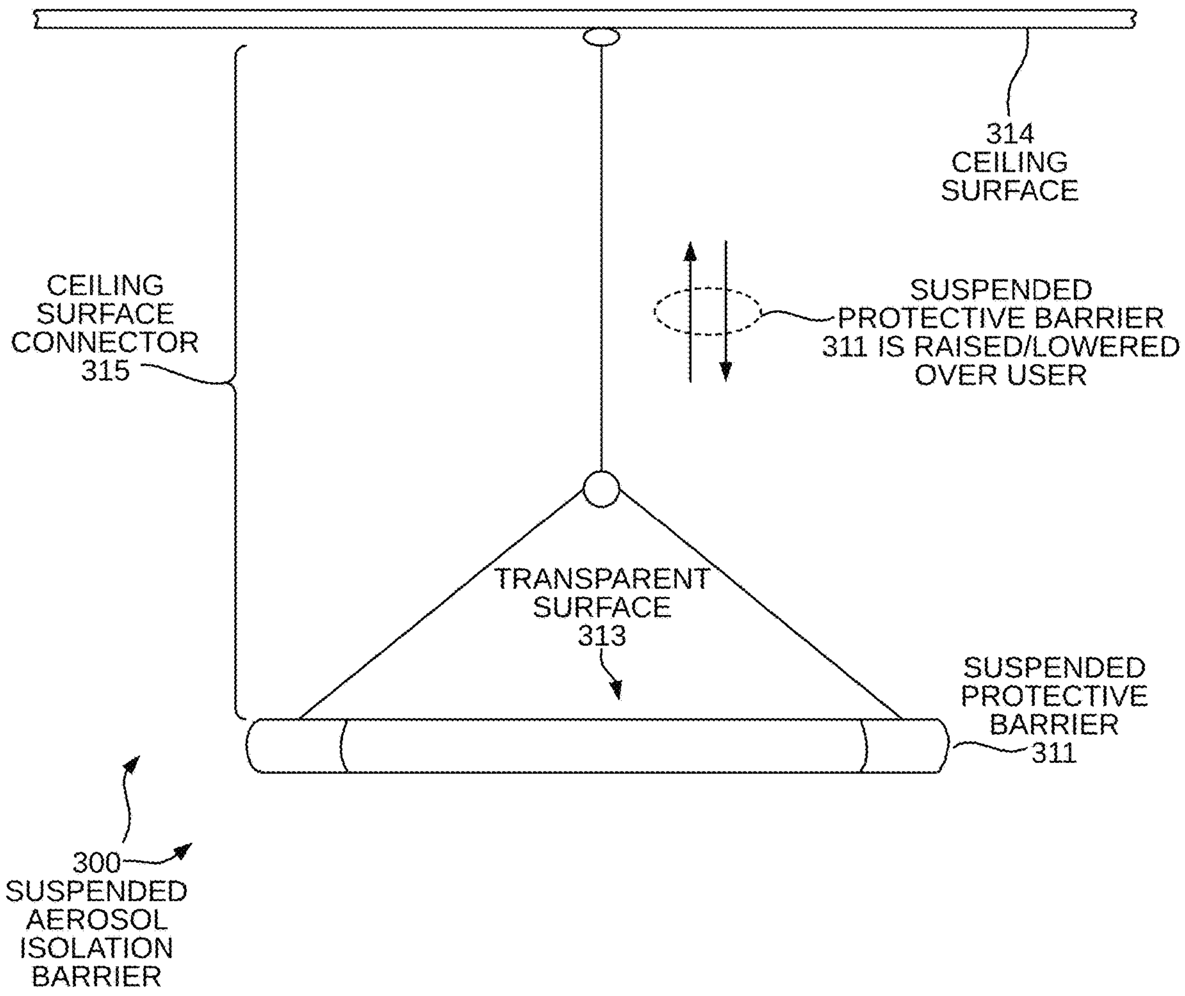
FIG. 8 is a diagram showing a Suspended Aerosol Isolation Barrier (SAIB) 300 in accordance with another embodiment.

FIG. 8 is a diagram showing a Suspended Aerosol Isolation Barrier (SAIB) 300 in accordance with another embodiment. The SAIB 300 includes a suspended protective barrier 311. In this embodiment, the SAIB 300 does not include any lateral or side protective barrier as is provided in SAIB 10 shown in FIG. 1. Despite not providing a lateral cover, the SAIB 300 tends to reduce aerosol transmission when used in various settings.

The suspended protective barrier 311 has a transparent surface 313. The suspended protective barrier 311 is attached to a ceiling surface 314 via a ceiling surface connector 315. In another example, the suspended protective barrier 311 attaches to a surface that is farther from the ground than the suspended protective barrier 311. In one example, a ceiling I-hook is connected to the ceiling surface 314 and the ceiling surface connector 315 connects to the ceiling I-hook. It is understood that ceilings and joists have different configurations and that any suitable ceiling attachment may be employed to attach the ceiling surface connector 315 to the ceiling surface 314.

Figure 9:
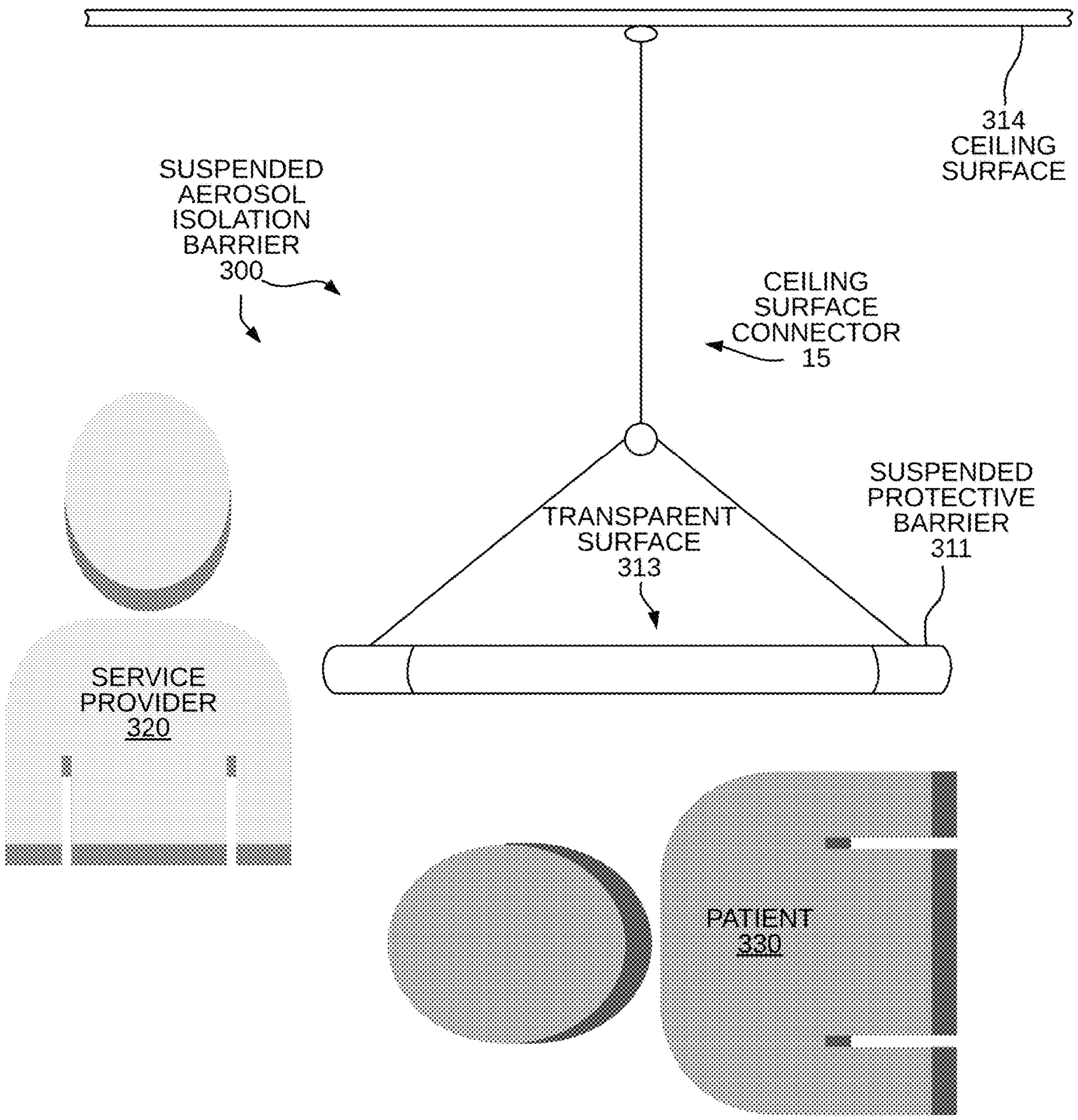
FIG. 9 is a diagram showing how the SAIB 300 reduces exposure to airborne particles and aerosols between medical provider 320 and patient 330.

FIG. 9 is a diagram showing how the SAIB 300 reduces exposure to airborne particles and aerosols between medical provider 320 and patient 330. The SAIB 300 is adjustable to be configured to cover and protect the patient 330. The suspended protective barrier 311 is height-adjustable. For example, a medical provider 320 raises the suspended protective barrier 311 upwards, the patient 330 is seated, and the medical provider 320 lowers the suspended protective barrier 311 over the patient 330. In one example, the ceiling surface connector 315 includes a chain, an S-hook, a split key ring, and end anchors. The chain is connected to the ceiling surface 314. The end anchors are attached to a frame of the suspended protective barrier 311. The S-hook connects the split key ring and end anchors to the chain at an appropriate level thereby allowing the suspended protective barrier 311 to be height-adjusted to a desired level.

The SAIB 300 provides significant flexibility for medical provider 320 to perform work on a patient 330. The medical provider 320 is able to approach a patient 330 from various sides and angles. The SAIB 300 accommodates all sizes of patients. The SAIB 300 is suspended overhead thereby providing for easy removal, allowing patient 330 to comfortably enter and exit, and providing adjustment of height of the SAIB 300 to be at a comfortable level for both the medical provider 320 and patient 330. Suspension of the SAIB 300 consumes minimal to no floor space thereby providing more leg room and operational space for medical provider 320.

Figure 10:
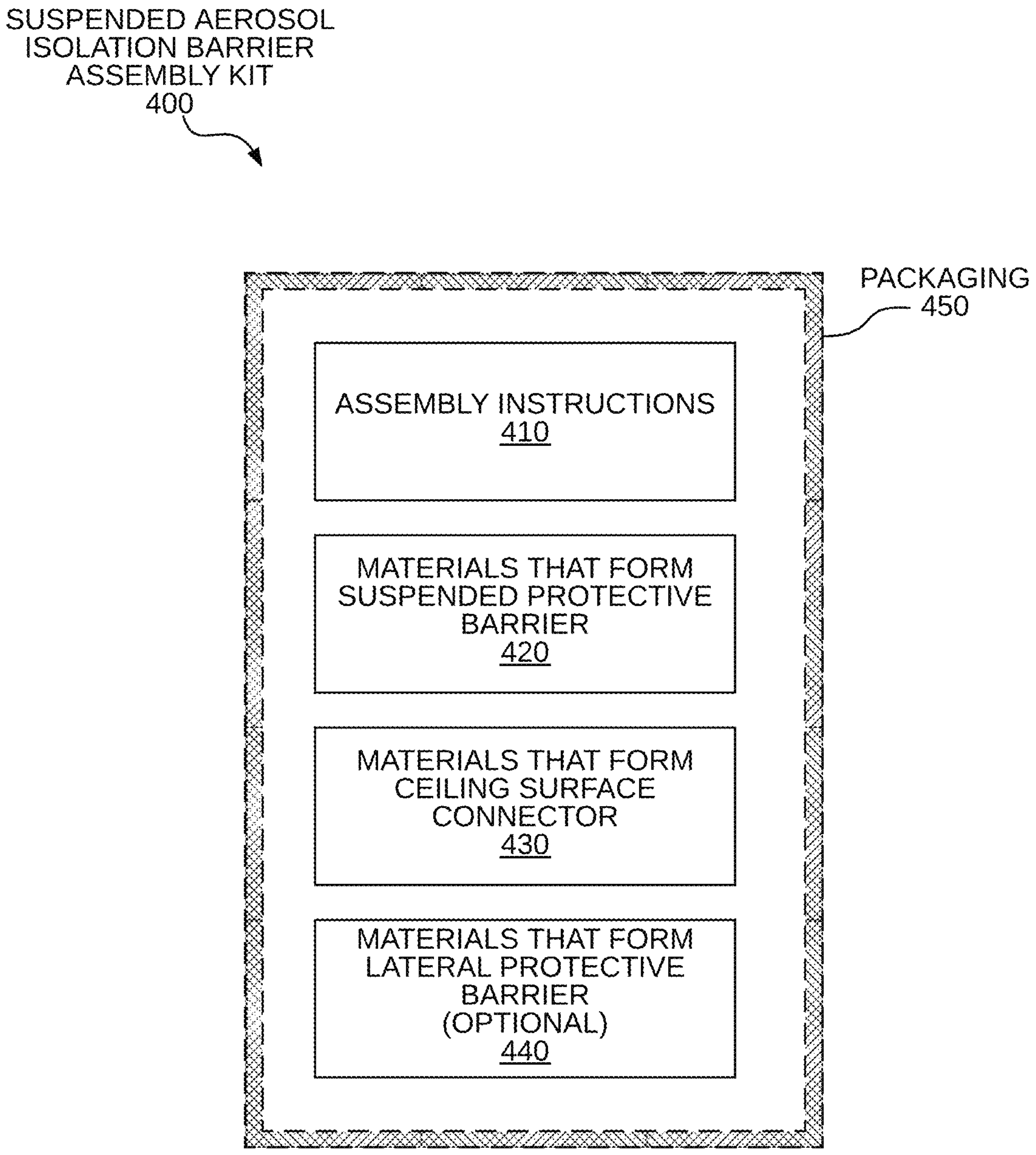
FIG. 10 is a diagram of a suspended aerosol isolation barrier assembly kit 400 in accordance with one embodiment.

FIG. 10 is a diagram of a suspended aerosol isolation barrier assembly kit 400 in accordance with one embodiment. The suspended aerosol isolation barrier assembly kit 400 is provided and is used to assemble a suspended aerosol isolation barrier (SAIB) such as the SAIB 10 shown in FIG. 1 or the SAIB 300 shown in FIG. 8. The suspended aerosol isolation barrier assembly kit 400 comprises assembly instructions 410, materials 420 that form the suspended protective barrier, materials 430 that form the ceiling surface connector, materials 440 that form the lateral protective barrier, and packaging 450. The materials 440 that form the lateral protective barrier are excluded in some embodiments in which the assembled suspended aerosol isolation barrier does not include a lateral protective barrier.

Figure 11B:
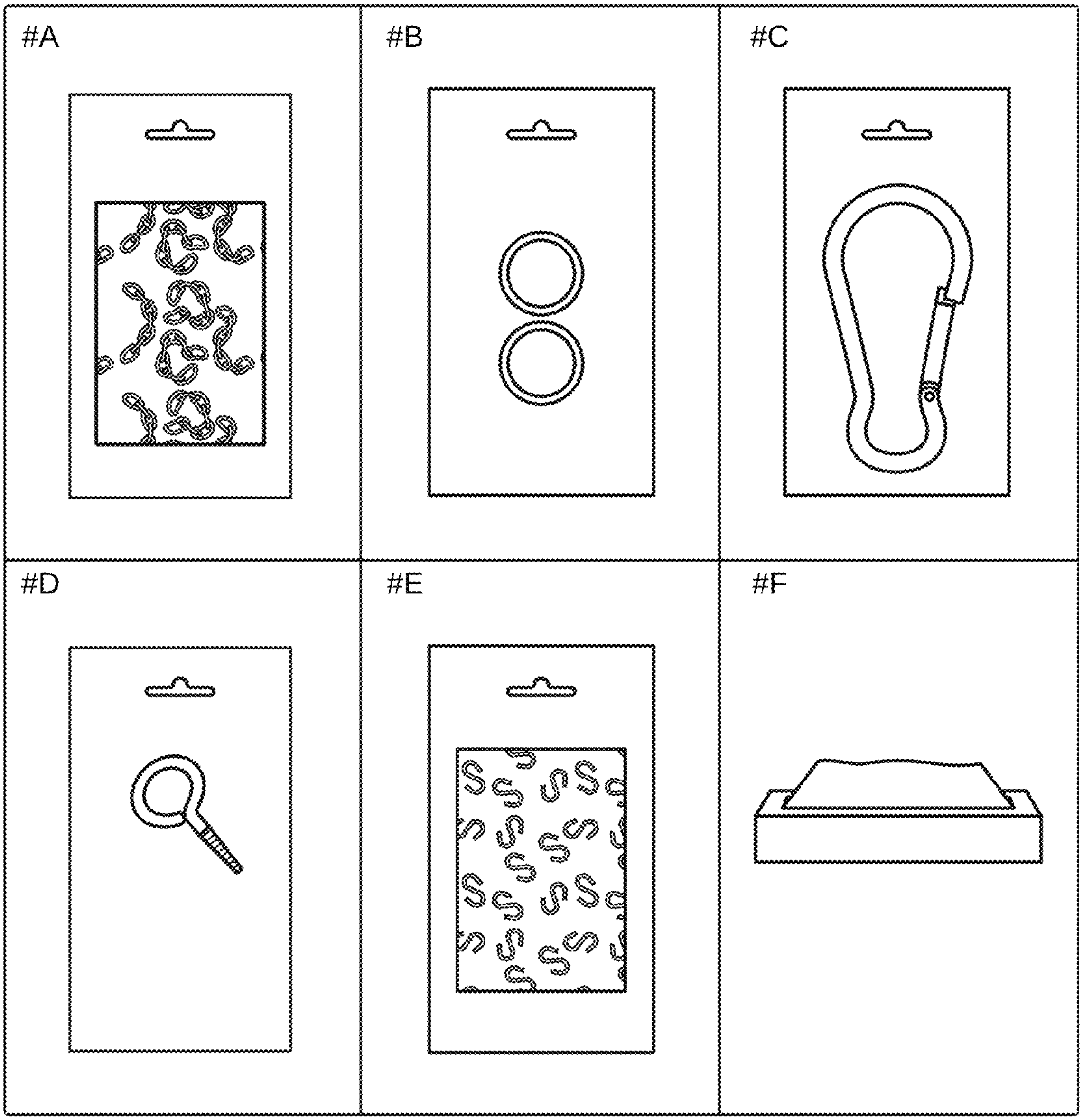
Figure 12B:
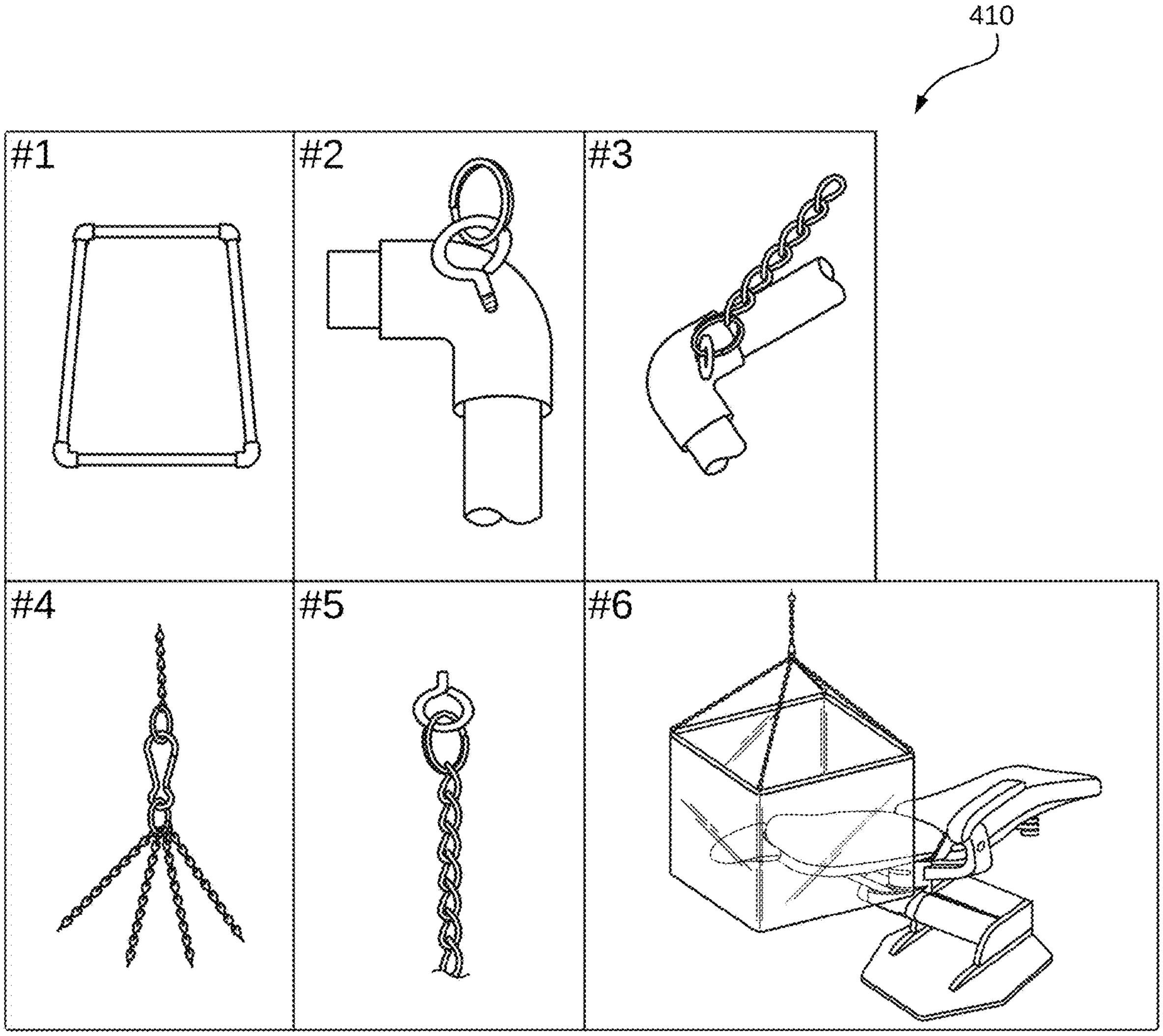

FIGS. 11A and 11B are diagrams showing materials 420, 430, and 440 provided with the suspended aerosol isolation barrier assembly kit 400. It is appreciated that the materials 420, 430, and 440 used to construct and install SAIB 10 or 300 are significantly lower cost as compared to conventional systems shown in FIG. 15. The materials 420, 430, and 440 are readily available at typical hardware stores. The SAIBs 10 and 300 and the assembly kit 400 provide a low-cost, mass adoptable solution to minimize transmission of aerosols between individuals.

FIGS. 12A, 12B, 13, and 14 are instructions 410 provided with the suspended aerosol isolation barrier assembly kit 400. For additional information on the structure and operation of one embodiment of the SAIBs 10 or 300 and how to construct one embodiment of the SAIBs 10 or 300, see U.S. Provisional Patent Application No. 63/071,774 filed on Aug. 28, 2020, the entire subject matter of which is incorporated herein by reference.

Figure 15:
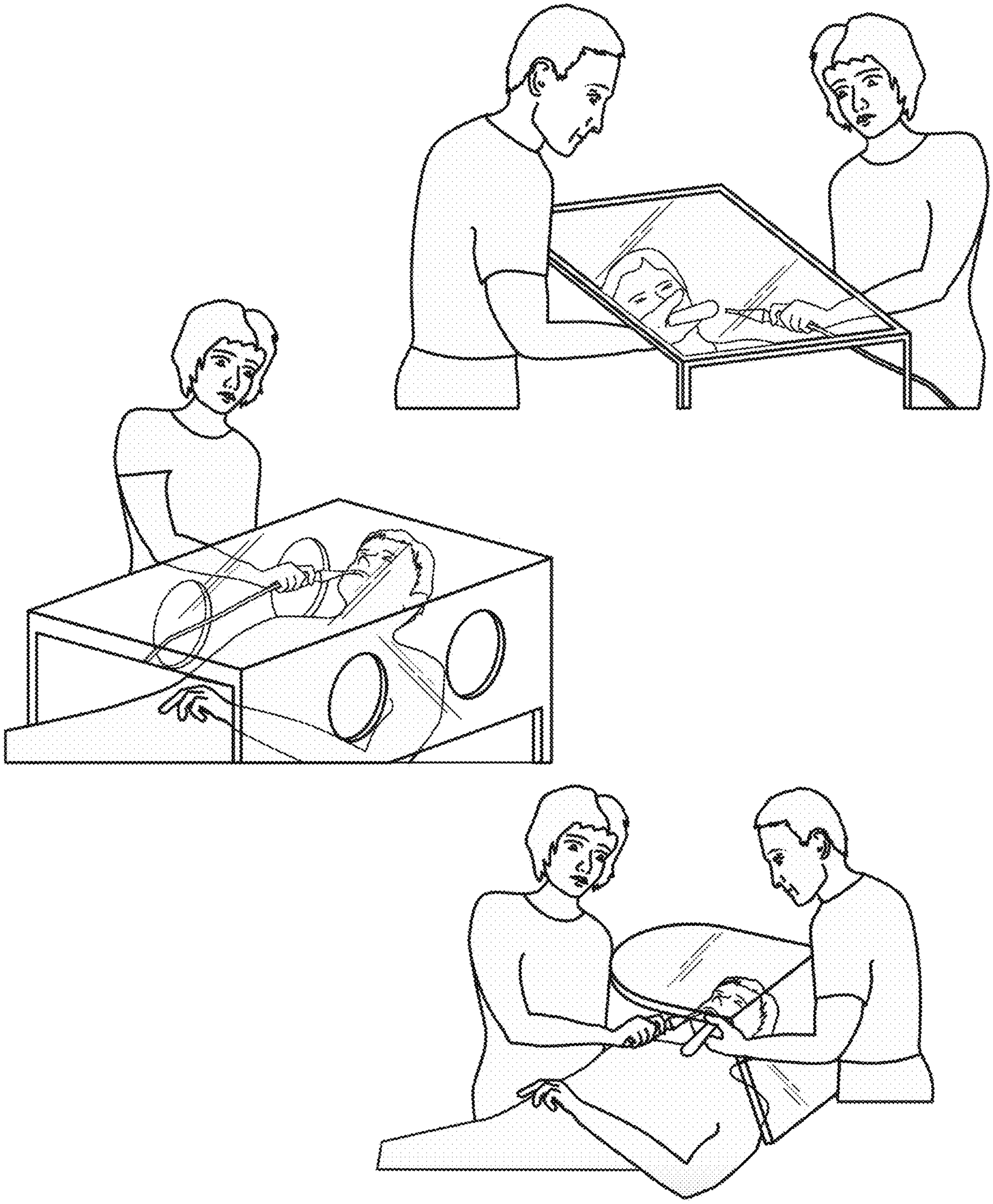
FIG. 15 is a diagram showing conventional aerosol transmission reduction techniques.

FIG. 15 is a diagram showing conventional aerosol transmission reduction techniques. The SAIB 10 and 300 provide significant advantages over existing aerosol transmission reduction systems. The known aerosol transmission reduction systems shown in FIG. 15 are supported by the floor thereby consuming leg space and valuable operational floor space. The known aerosol transmission reduction systems shown in FIG. 15 also do not provide for height adjustability and tend to cause some patients to feel claustrophobic. The known aerosol transmission reduction systems shown in FIG. 15 also do not provide flexibility or movement thereby limiting functionality for use in various settings.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An apparatus comprising:

a suspended protective barrier having a transparent surface, wherein the suspended protective barrier is attachable to a ceiling surface disposed above the suspended protective barrier; and a ceiling surface connector having a chain and a hook, wherein the chain attaches the suspended protective barrier to the ceiling surface, wherein the hook is attachable to links of the chain such that the suspended protective barrier is height-adjustable to a desired level, wherein the hook is an S-hook, wherein an end of the chain is connected to the ceiling surface, and wherein the ceiling surface connector also includes a split key ring and end anchors.

2. The apparatus of claim 1, further comprising:

a lateral protective barrier, wherein the lateral protective barrier is attachable to the suspended protective barrier and extendable downwards from the suspended protective barrier.

3. The apparatus of claim 2, wherein the lateral protective barrier is a flexible material.

4. The apparatus of claim 2, wherein the lateral protective barrier is disposable.

5. The apparatus of claim 1, wherein the ceiling surface connector comprises:

a first of the end anchors attaches to a first corner of the suspended protective barrier;

a second of the end anchors attaches to a second corner of the suspended protective barrier;

a third the end anchors attaches to a third corner of the suspended protective barrier; and a fourth of the end anchors attaches to a fourth corner of the suspended protective barrier, wherein each of the end anchors attaches to the split key ring.

6. The apparatus of claim 1, wherein the suspended protective barrier comprises:

a frame that surrounds and supports the transparent surface.

7. The apparatus of claim 1, wherein the transparent surface is a rigid structure that is non-opaque.

8. The apparatus of claim 1, wherein the apparatus is a Suspended Aerosol Isolation Barrier (SAIB).

9. The apparatus of claim 1, wherein the suspended protective barrier has a frame, wherein the end anchors are attached to the frame of the suspended protective barrier, and wherein the S-hook connects the split key ring and end anchors to the chain at the desired level.

10. A method comprising:

providing a suspended protective barrier, wherein the suspended protective barrier includes a transparent layer, wherein the suspended protective barrier attaches to a ceiling surface disposed above the suspended protective barrier via a ceiling surface connector having a chain and a hook, wherein the hook is attachable to links of the chain such that the suspended protective barrier is height-adjustable to a desired level, wherein the hook is an S-hook, wherein an end of the chain is connected to the ceiling surface, and wherein the ceiling surface connector also includes a split key ring and end anchors.

11. The method of claim 10, further comprising:

instructing a user to attach the suspended protective barrier to the ceiling surface by attaching the suspended protective barrier to the chain at the desired level using the S-hook.

12. The method of claim 11, wherein the user is a service provider, the method further comprising:

instructing the service provider to lower the suspended protective barrier over a patient such that the patient is covered by the suspended protective barrier.

13. The method of claim 12, further comprising:

instructing the service provider to attach a lateral protective barrier to a perimeter of the suspended protective barrier.

14. The method of claim 13, further comprising:

instructing the service provider to dispose of the lateral protective barrier and sanitize the suspended protective barrier after providing services to the patient; and attaching a new lateral protective barrier to the perimeter of the suspended protective barrier before receiving a new patient.

15. The method of claim 13, wherein the lateral protective barrier is a flexible material.

16. The method of claim 13, wherein the lateral protective barrier is disposable.

17. The method of claim 10, wherein the suspended protective barrier includes a frame, and wherein the frame is disposed along a perimeter of the transparent layer.

18. The method of claim 10, wherein the S-hook connects the end anchors attached to a frame of the suspended protective barrier to links of the chain at the desired level.

19. The method of claim 10, wherein the transparent layer is a rigid structure that is non-opaque.

20. The method of claim 19, wherein the suspended protective barrier and the ceiling surface connector are parts of a Suspended Aerosol Isolation Barrier (SAIB).

* * * * *